Patented Apr. 29, 1952

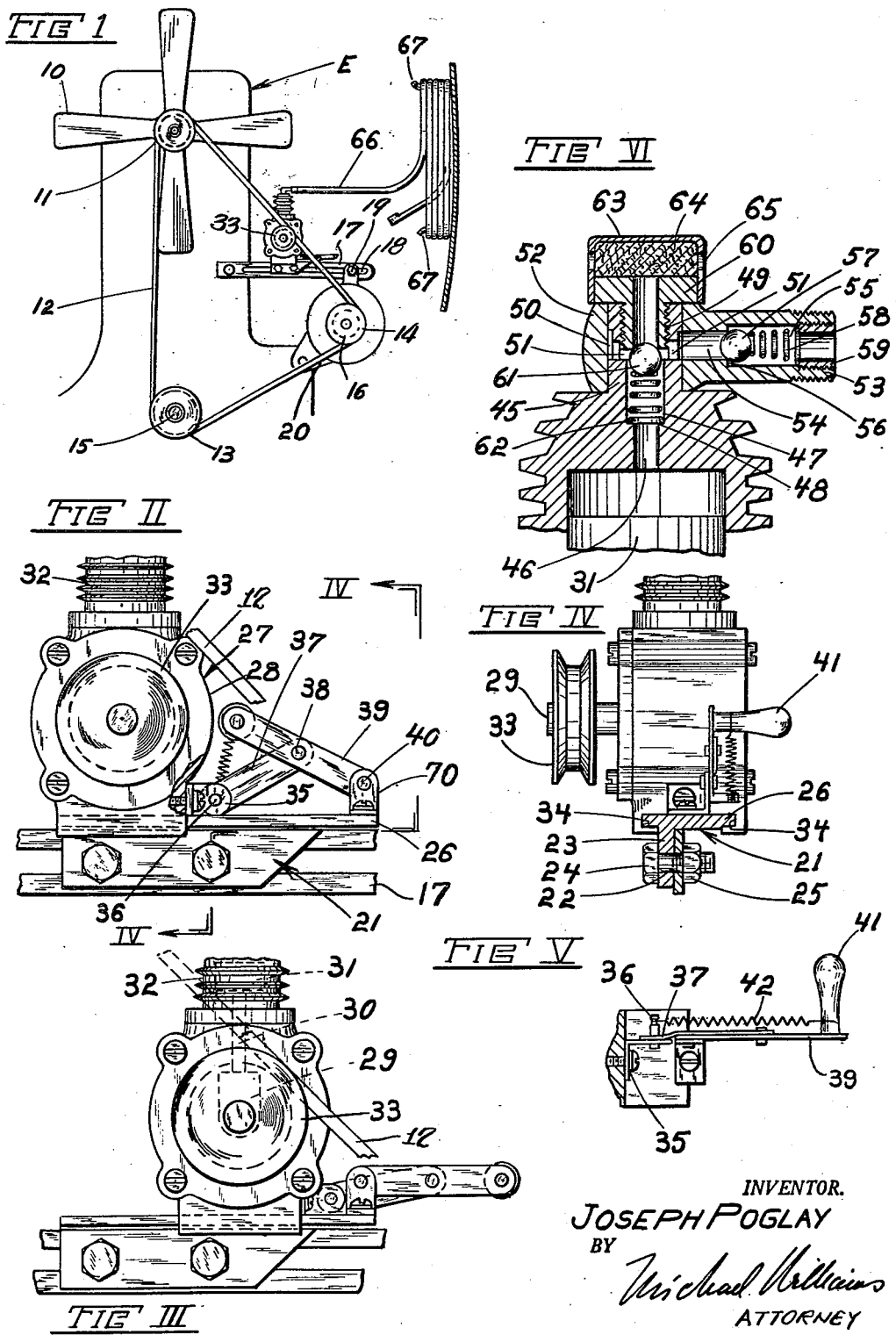

2,595,098

UNITED STATES PATENT OFFICE 2,595,098

AIR COMPRESSOR ACCESSORY FOR VEHICLES

Joseph Poglay, Warrensville Heights, Ohio

Application July 7, 1948, Serial No. 37,435

4 Claims. (Cl. 230—38)

My invention relates to an air compressor accessory for vehicles, and more particularly to an accessory for a vehicle having a fan belt and a generator, and the principal object of my invention is to provide new and improved accessories of this character.

My invention is particularly useful as an accessory for an automobile, and is so designed that it may be supplied as standard equipment or as a purchasable accessory at any time during the life of the car.

It is a well known fact that maximum tire life and maximum gasoline mileage is achieved only if the tires are properly inflated. Yet it has been found that the ordinary automobile owner usually does not have time to spare to check tire pressure when at a service station, and does not have satisfactory inflating equipment at his garage.

Further, ordinary tire pumps involve tiresome work when inflating a tire on the road, such as when a tire has gone "soft" or has been repaired.

Attempts have been made in the prior art to provide an air pump driven by the auto engine, but such attempts have not proven commercially successful, partly because of their costly nature, and partly because of the difficulty in their assembly and operation.

My invention provides an air compressor which may be attached to an automobile in a matter of minutes and which is low in cost and sure of operation.

Referring to the drawing accompanying this specification, there is shown, for purposes of illustration, an embodiment which my invention may assume, and in this drawing:

Figure 1 is a general elevational view showing the combination of my invention with cooperable parts of an automobile engine, Figure 2 is an enlarged elevation of the embodiment in one position, Figure 3 is a view similar to Figure 2 with the embodiment shown in another position, Figure 4 is a sectional view corresponding generally to the line 4—4 of Figure 2, Figure 5 is a plan view of linkage mechanism used in the embodiment shown, and Figure 6 is an enlarged fragmentary sectional view showing a valving arrangement used.

With particular reference to Figure 1, the usual vehicle engine E includes a fan 10 having a pulley 11 secured thereto for driving the fan. A fan belt 12 passes over the pulley 11, and over pulleys 13 and 14 respectively rotatable with the crankshaft 15 and the generator shaft 16.

My invention comprises a support adapted to be secured in proximity to the fan belt 12, and an air compressor movably mounted on the support and having a driving pulley movable into and out of engagement with the fan belt depending upon the position of the air compressor.

Most modern cars have an adjustment arm 17 for adjusting fan belt tension, and as seen in Figure 1, such arm is connected to the engine block and is usually provided with an elongated slot 18. A bolt 19 passes through an ear on the generator and a nut tightens the connection between the arm 17 and the generator ear. Thus, the generator may be swung about a bracket 20 to adjust the tension of the fan belt 12.

The support 21 of my invention utilizes the ease of connection offered by the adjustment bar 17, and as best seen in Figures 2, 3 and 4, the support 21 is formed generally T-shaped in cross-section and is provided with a pair of apertures 22 in its stem 23, each aperture being adapted to pass a bolt 24. Each bolt passes through the slot 18 in the adjustment bar 17, and nuts 25 are drawn up on the bolts 24 to secure the stem 23 rigidly to the bar 17. It will be obvious that by merely loosening the nuts 25, the support may be adjusted along the bar 17.

The head 26 of the support 21 forms a slide on which is mounted the air compressor. As will be obvious from inspection of Figure 1, the air compressor used need not be of massive size since it has been found that a small compressor driven at substantial speed by the fan belt will provide a sufficient supply of air for all practical purposes.

The air compressor 27 herein shown comprises a casing 28 housing a crankshaft 29 to which is journalled a rod 30 of a piston 31. The piston is reciprocable in a suitable air cooled cylinder 32. A pulley 33 is secured to the crankshaft 29, for effecting reciprocation of the piston 31.

The lower end of the casing 28 is provided with elongated grooves 34 which slidably fit the head 26 of the support 21, so that the entire air compressor 27 may be slid along the support 21, toward or away from the fan belt 12, whereby the pulley 33 may be engaged with or disengaged from the fan belt 12.

Secured to the casing 28, adjacent to the head 26 of the support 21 is an angle piece 35, one leg being bolted to the casing and the other leg carrying a pin 36. One end of a lever 37 is pivotally mounted on the pin 36, and the other end is pivoted, as at 38, to a lever 39 intermediate the ends thereof.

An angle piece 70 is secured to the head 26, and one end of the lever 39 is pivoted thereto, as at 40. In the present embodiment, the opposite end of the lever 39 is formed with a handle 41 for effecting operation of the linkage, although it is intended to include within this invention a flexible connection operable from the dash-board and connectable to the end of the lever 39 now carrying the handle 41. A coil spring 42 is connected between the handle 41 and the pivot pin 36.

The linkage herein shown operates along the lines of a toggle connection for effecting movement of the air compressor 27 along the slide formed by the support 21. In the position shown in Figure 2, the spring 42 urges the levers 37, 39 to align themselves, thus urging the pulley 33 of the air compressor out of engagement with the fan belt 12. It is desirable that the support 21 is so adjusted on the bar 17 that the levers 37, 39 are in such relative relation, as suggested in Figure 2, whereby the spring 42 maintains the pulley 33 out of engagement with the fan belt 12.

When the lever 39 is swung to position shown in Figure 3, either by manipulation of the handle 41, or by operation of the flexible connection from the dash-board, the pivots 36, 38, and 40 so align themselves that the air compressor is locked in its position wherein the pulley 33 is in engaged relation with the fan belt 12.

Referring to Figure 6, the preferred valve arrangement herein shown comprises a tubular member 45 which may be formed integral with the cylinder 32. A passage 46 leads outwardly from the top of the cylinder 32 and communicates with a larger passage 47, forming a shoulder 48 therebetween. The extremity of the tubular member 45 is interiorly threaded, as shown at 49.

Intermediate its ends, the tubular member 45 is formed with an annular groove 50, and lateral parts 51 establish communication between the interior of the tubular member 45 and the annular groove 50. A fitting 52 has a tight swing fit about the tubular member 45, such fitting having a neck 53 formed with a passage 54 communicating with the groove 50 and an enlarged passage 55 extending outwardly to the extremity of the neck, forming a shoulder 56 with the passage 54. A ball valve 57 is disposed within the neck 53, seating against the shoulder 56, and a coil spring 58 yieldably holds the ball valve 57 in seating relation. A plug 59 threaded into the neck 53 forms an abutment for the spring.

A stud 60 is threaded into the end of the tubular member 45, and holds the fitting 52 in proper swinging relation. The lower end of the stud forms a seat for a ball valve 61, and the ball valve is yieldably urged to seating relation by a coil spring 62 which bears against the shoulder 48.

A cap 63 has snap fit over the head of the stud 60, providing a space which is preferably filled with an air filtering substance, such as metal wool 64. The cap 63 is provided with apertures 65 for the admission of air.

In operation, on the suction stroke of the piston 31, the ball 61 is unseated and air is drawn through the apertures 65 in the cap 63, filtered by passage through the substance 64, and enters the cylinder 32. On the compression stroke of the piston 31, the ball valve 61 seats, and compressed air passes outwardly of the parts 51, through the groove 50, and unseats the valve 57 to permit passage of compressed air through the neck 53.

A rubber hose 66, of substantial length so as to reach all tires, may have the usual threaded connection with the neck 53. As shown in Figure 1, the hose 66, when not in use, may be wound upon spaced fingers 67 mounted underneath the hood of the engine on any suitable support. If desired, the hose 66 may be wound upon a self-winding reel. The extremity of the hose 66 may have the usual tire valve connection. If desired, an air valve may be included as a separable item, to be connected to the free end of the hose 66, for the purpose of blowing dust, dirt, and other foreign matter from the engine.

In view of the foregoing, it will be apparent to those skilled in the art that I have accomplished at least the principal object of my invention, and it also will be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only, and that my invention is not limited thereto.

I claim.

1. An air compressor attachment for a vehicle having a fan belt and a slotted adjustment bar for the generator, comprising: a support adapted to be mounted on said bar, and being adjustable therealong for positionment in proximity to said fan belt; an air compressor slidably mounted on said support, having a pulley movable into and out of engagement with said fan belt depending upon the position of said air compressor; and means for effecting movement of said air compressor, including toggle linkage means for rigidly holding said air compressor in position where said pulley is in engagement with said fan belt, and spring means for yieldably urging said air compressor to position where said pulley is out of engagement with said fan belt.

2. An air compressor attachment for a vehicle having a fan belt and a slotted adjustment bar for the generator, comprising: an elongated support of T cross-section providing leg and head portions; fastening means for securing said leg portion to said slotted bar and providing for adjustment of said support along said bar so that said support may be positioned in proximity to said fan belt; an air compressor having a driving pulley and also having a plurality of grooves, the defining surfaces of each groove being adapted to slidably engage respective opposite longitudinal marginal surfaces of said head portion, said air compressor being adjustable along said head portion whereby said driving pulley may be moved into and out of engagement with said fan belt; and means for effecting movement of said air compressor.

3. An air compressor attachment for a vehicle having a fan belt and a slotted adjustment bar for the generator, comprising an elongated support of T cross-section providing leg and head portions; fastening means for securing said leg portion to said slotted bar and providing for adjustment of said support along said bar so that said support may be positioned in proximity to said fan belt; an air compressor having a driving pulley and also having a plurality of grooves, the defining surfaces of each groove being adapted to slidably engage respective opposite longitudinal marginal surfaces of said head portion, said air compressor being adjustable along said head portion whereby said driving pulley may be moved into and out of engagement with said fan belt; toggle linkage means for effecting movement of said air compressor; and spring means acting on said toggle linkage for yieldably holding said pulley out of engagement with said fan belt.

4. An air compressor attachment for a vehicle having a fan belt and a slotted adjustment bar for the generator, comprising: an elongated support of T cross-section providing leg and head portions; fastening means for securing said leg portion to said slotted bar and providing for adjustment of said support along said bar so that said support may be positioned in proximity to said fan belt; an air compressor having a driving pulley and also having a plurality of grooves, the defining surface of each groove being adapted to slidably engage respective opposite longitudinal marginal surfaces of said head portion, said air compressor being adjustable along said head portion whereby said driving pulley may be moved into and out of engagement with said fan belt; linkage means for effecting movement of said air compressor, comprising a first link having one end pivoted to said air compressor and a second link having one end pivoted to said support, the other end of said first link being pivotally connected to an intermediate portion of said second link, and the other end of said second link providing means for effecting movement of said linkage mechanism; and spring means acting on said linkage for yieldably holding said pulley out of engagement with said fan belt.

JOSEPH POGLAY.

REFERENCES CITED

The following references are of record in the file of this patent:

UNITED STATES PATENTS

| Number | Name | Date |
|---|---|---|
| 899,585 | Whitaker | Sept. 29, 1908 |
| 1,250,825 | Flagin | Dec. 18, 1917 |
| 1,382,018 | Schreiber | June 21, 1921 |
| 1,397,829 | Wilson | Nov. 22, 1921 |
| 1,414,573 | Krehlik | May 2, 1922 |
| 1,484,987 | Dodd | Feb. 26, 1924 |
| 1,502,751 | Shallenberg | July 29, 1924 |
| 1,719,572 | Stoll | July 2, 1929 |
| 1,763,155 | Hughes | June 10, 1930 |
| 1,802,466 | Gravelle | Apr. 28, 1931 |
| 1,994,874 | Sams, et al. | Mar. 19, 1935 |
| 2,089,381 | Kassing | Aug. 10, 1937 |
| 2,461,174 | Peterman | Feb. 8, 1949 |